(12) United States Patent
Mori

(10) Patent No.: US 8,287,032 B2
(45) Date of Patent: Oct. 16, 2012

(54) VEHICLE LOWER BODY STRUCTURE

(75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 175 days.

(21) Appl. No.: 12/632,198

(22) Filed: Dec. 7, 2009

(65) Prior Publication Data

US 2010/0140977 A1  Jun. 10, 2010

(30) Foreign Application Priority Data

Dec. 8, 2008  (JP) .................................. 2008-312151
Nov. 19, 2009  (JP) .................................. 2009-264083

(51) Int. Cl.
*B62D 21/02* (2006.01)
*B62D 25/20* (2006.01)

(52) U.S. Cl. .......... 296/187.08; 296/187.03; 296/203.01

(58) Field of Classification Search ............... 296/184.1, 296/187.01, 187.03, 187.08, 187.12, 193.01, 296/193.07, 203.01, 203.03, 203.04, 204, 296/205; *B62D 21/00, 21/02, 25/20*

See application file for complete search history.

(56) References Cited

FOREIGN PATENT DOCUMENTS

| JP | 2001-71930 | | 3/2001 | |
|----|------------|---|--------|---|
| JP | 2005-104254 | | 4/2005 | |
| JP | 2006-290140 | | 10/2006 | |
| JP | 2006321366 | A | * | 11/2006 |
| JP | 2007-283976 | | 11/2007 | |
| JP | 4032657 | | 11/2007 | |
| JP | 2008254660 | A | * | 10/2008 |

OTHER PUBLICATIONS

Chinese Office Action issued Jun. 16, 2011, in Patent Application No. 200910252996.4 (with English-language translation).

* cited by examiner

*Primary Examiner* — Dennis Pedder
*Assistant Examiner* — Jason S Daniels
(74) *Attorney, Agent, or Firm* — Oblon, Spivak, McClelland, Maier & Neustadt, L.L.P.

(57) ABSTRACT

A vehicle lower body structure includes a cross member that extends in the vehicle-width direction, that defines part of a vehicle compartment, and that includes a first cross member which is formed of a plate member and a second cross member which is formed of a plate member and which is provided at a position closer to the rear of a vehicle than the first cross member, the first cross member and the second cross member facing each other. A plurality of closed section portions is formed by the first cross member and the second cross member. The closed section portions are connected to each other via a portion at which the first cross member and the second cross member are continuously overlapped with each other.

14 Claims, 6 Drawing Sheets

VEHICLE LOWER BODY STRUCTURE

INCORPORATION BY REFERENCE

The disclosure of Japanese Patent Application No. 2008-312151 filed on Dec. 8, 2008 and Japanese Patent Application No. 2009-264083 filed on Nov. 19, 2009 each including the specification, drawings and abstract are incorporated herein by reference in their entireties.

BACKGROUND OF THE INVENTION

1. Field of the Invention

The invention relates to a vehicle body structure of, for example, an automobile, and more specifically to a vehicle lower body structure that includes a cross member which extends in the vehicle-width direction.

2. Description of the Related Art

There is a vehicle lower body structure of an automobile in which a step portion, a so-called raised portion (kick-up portion), is formed on a floor of a vehicle compartment. Japanese Patent Application Publication No. 2006-290140 (JP-A-2006-290140) (refer especially to abstract and FIG. 3) describes a vehicle lower body structure of this type. According to JP-A-2006-290140, a second raised portion (5) is formed in a floor panel (2) at a middle portion in the front-rear direction, and the second raised portion (5) is provided with cross members (14A, 16) that extend in the vehicle-width direction and that form closed section portions (15A, 17).

In the vehicle lower body structure described in JP-A-2006-290140, the second raised portion (5) is provided with the cross members (14A, 16) that form the closed section portions (15A, 17), and the cross members (14A, 16) are arranged separately. The cross member (16) is provided at an upper portion of the second raised portion (5), and the cross member (14A) is provided at a lower portion of the second raised portion (5). Therefore, in order to increase the buckling strength of the second raised portion (5) in the lateral direction of a vehicle body and the bending strength of the second raised portion (5) in the front-rear direction of the vehicle body, the cross members (14A, 16) need to be upsized or the thickness of the cross members (14A, 16) need to be increased. However, upsizing of the cross members (14A, 16) or an increase in the thickness of the cross members (14A, 16) results in an increase in the weight of the vehicle body.

SUMMARY OF THE INVENTION

The invention provides a vehicle lower body structure with which the strength of a frame that forms a vehicle compartment is increased without an increase in the weight of a vehicle body.

An aspect of the invention relates to a vehicle lower body structure, that includes a cross member that extends in the vehicle-width direction, that defines part of a vehicle compartment, and that includes a first cross member which is formed of a plate member and a second cross member which is formed of a plate member and which is provided at a position closer to the rear of a vehicle than the first cross member, the first cross member and the second cross member facing each other. A plurality of closed section portions is formed by the first cross member and the second cross member. The closed section portions are connected to each other via a portion at which the first cross member and the second cross member are continuously overlapped with each other.

In the vehicle lower body structure according to the aspect of the invention, the plurality of the closed section portions is formed between the first cross member and the second cross member that extend in the vehicle-width direction. Therefore, the buckling strength of the cross member in the lateral direction of the vehicle body and the bending strength of the cross member in the longitudinal direction of the vehicle body are increased. As a result, the strength of a frame that forms the vehicle compartment is increased.

The closed section portions are connected to each other via the portion at which the first cross member and the second cross member are continuously overlapped with each other. Therefore, the buckling strength of the cross member in the lateral direction of the vehicle body and the bending strength of the cross member in the longitudinal direction of the vehicle body are further increased. As a result, the strength of a frame that forms the vehicle compartment is further increased.

As described above, a plurality of continuous closed section portions is formed between the first cross member and the second cross member. Therefore, it is possible to increase the strength of the frame that forms the vehicle compartment without an increase in the weight of the vehicle body.

In the aspect of the invention described above, the second cross member may have at least two projection portions that project toward the rear of the vehicle, and that are used to form the closed section portions. In this case, the first cross member is formed of a flat plate member. Therefore, the cross member does not have recesses and projections within the vehicle compartment.

In the aspect of the invention described above, one of the first cross member and the second cross member may be formed by bending part of a floor panel. In this case, the production cost is reduced because the second cross member and the floor panel are formed of the same member. In addition, the buckling strength of the cross member in the lateral direction of the vehicle body and the bending strength of the cross member in the front-rear direction of the vehicle body are increased easily by changing, for example, the material or the thickness of the first cross member. That is, because a desired strength is achieved by appropriately designing the first cross member, it is possible to suppress an increase in the weight of the floor panel.

In the aspect of the invention described above, the first cross member may have a higher strength against a load applied from the front of the vehicle than the second cross member for the following reason. When a load is applied from the front of the vehicle to the center portion of the cross member, a compression force is applied to the first cross member that is closer to the front of the vehicle, and a tensile force is applied to the second cross member that is closer to the rear of the vehicle. Generally, the condition for deformation, which should be satisfied by a member that receives a compression force, is severer than the condition for deformation, which should be satisfied by a member that receives a tensile force.

In the aspect of the invention described above, the first cross member may have at least two projection portions that project toward the front of the vehicle, and that are used to form the closed section portions; and an end portion of a floor reinforcement member, which is provided on a floor of the vehicle compartment and which extends in the front-rear direction of a vehicle body, may be connected to an end face of the lowest projection portion of the first cross member, which defines part of the vehicle compartment. In this case, if a load is applied from the front of the vehicle to the floor of the vehicle compartment, the load is efficiently transmitted from the floor reinforcement member to the cross member.

According to the aspect of the invention described above, it is possible to increase the buckling strength of the cross member in the lateral direction of the vehicle body and the bending strength of the cross member in the longitudinal direction of the vehicle body. As a result, it is possible to increase the strength of a frame that forms the vehicle compartment.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF THE EMBODIMENTS

Figure 1:
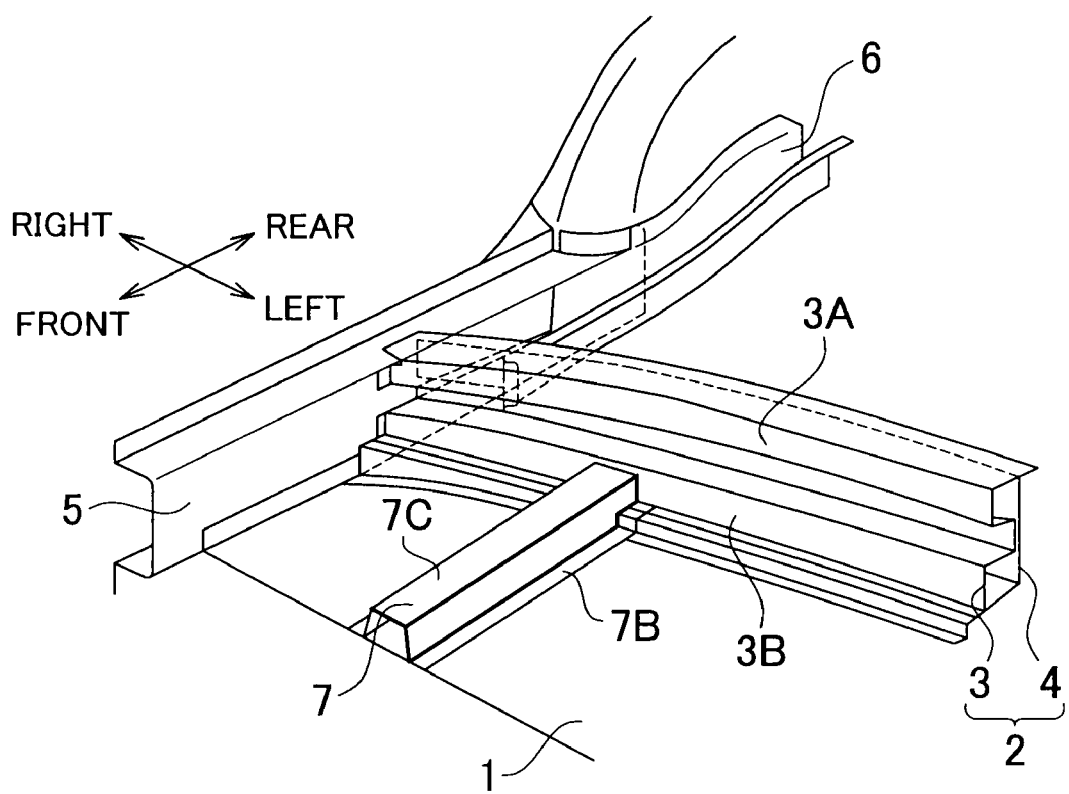
FIG. 1 is a perspective view showing a portion of a vehicle lower body structure according to a first embodiment of the invention when viewed from a position in a vehicle compartment.

Hereafter, vehicle lower body structures according to example embodiments of the invention will be described with reference to the accompanying drawings. In the drawings, the same or corresponding portions will be denoted by the same reference numerals. In addition, the same or corresponding portions will be described only once below.

The vehicle lower body structure according to the first embodiment of the invention is, for example, a structure of a lower portion of a vehicle compartment of an automobile. As shown in FIG. 1, at a rear portion of a front floor (floor panel) 1 that forms a lower portion of the vehicle compartment, a center floor cross member 2 is arranged as a cross member that forms a step portion which extends upward from the front floor 1. The center floor cross member 2 is formed of a front cross member 3 that is a first cross member which defines part of the vehicle compartment and which faces the front of a vehicle body, and a rear cross member 4 that is a second cross member which is connected to the rear face of the front cross member 3.

A right portion and a left portion (left portion is not shown) of the front floor 1 are connected to rocker inner members 5 each of which has a hat-shaped cross section, and rear floor side members 6 are connected to rear portions of the rocker inner members 5. Paired right and left front floor members 7, each of which is used as a floor reinforcement member, has a hat-shaped cross section and extends in the front-rear direction of the vehicle body, are connected to the upper face of the front floor 1 at side portions close to the rocker inner members 5.

Figure 2:
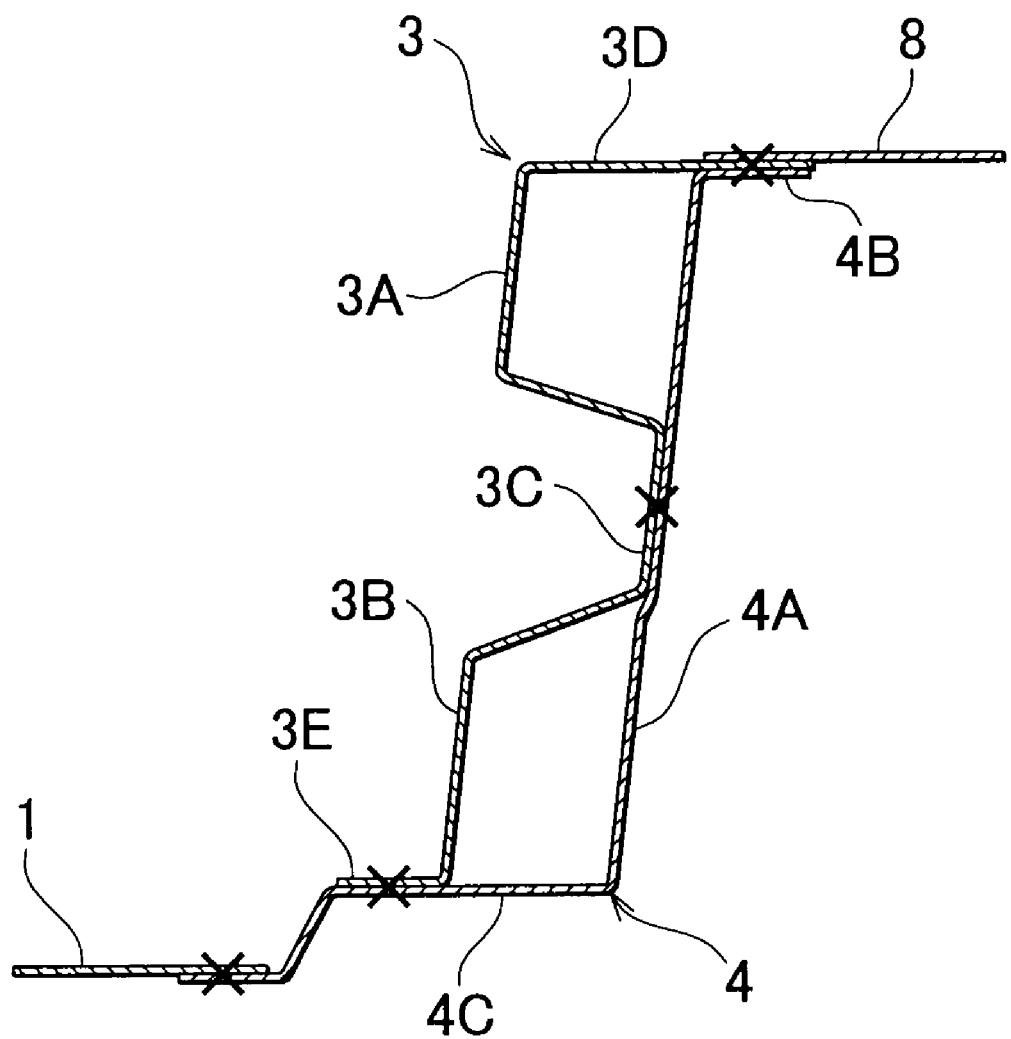
FIG. 2 is a vertical cross-sectional view showing a cross member shown in FIG. 1.

As shown in an enlarged view in FIG. 2, the front cross member 3 has a corrugated cross section so that the front cross member 3 forms a plurality of closed section portions in cooperation with the rear cross member 4. That is, the cross section of the front cross member 3 is in a corrugated shape throughout the entire longitudinal region, and a recessed face portion 3C is formed between an upper projection face portion 3A and a lower projection face portion 3B that define part of the vehicle compartment. The front cross member 3 has an upper connection portion 3D that extends from an upper portion of the upper projection face portion 3A toward the rear of the vehicle body and that is connected to the bottom face of a front end portion of a rear floor 8, and a lower connection portion 3E that extends from a lower portion of the lower projection face portion 3B toward the front of the vehicle body.

The rear cross member 4 is a flat plate member that is connected to the front cross member 3, and has a substantially L-shaped cross section. The rear cross member 4 has a vertical wall portion 4A that is connected to the rear face of the recessed face portion 3C of the front cross member 3, an upper connection portion 4B that extends from an upper portion of the vertical wall portion 4A toward the rear of the vehicle body and that is connected to the front end portion of the rear floor 8 together with the upper connection portion 3D of the front cross member 3, and a lower connection portion 4C that extends from a lower portion of the vertical wall portion 4A toward the front of the vehicle body and that is connected to the bottom face of a rear end portion of the front floor 1. The lower connection portion 3E of the front cross member 3 is connected to the upper face of the lower connection portion 4C.

Figure 3:
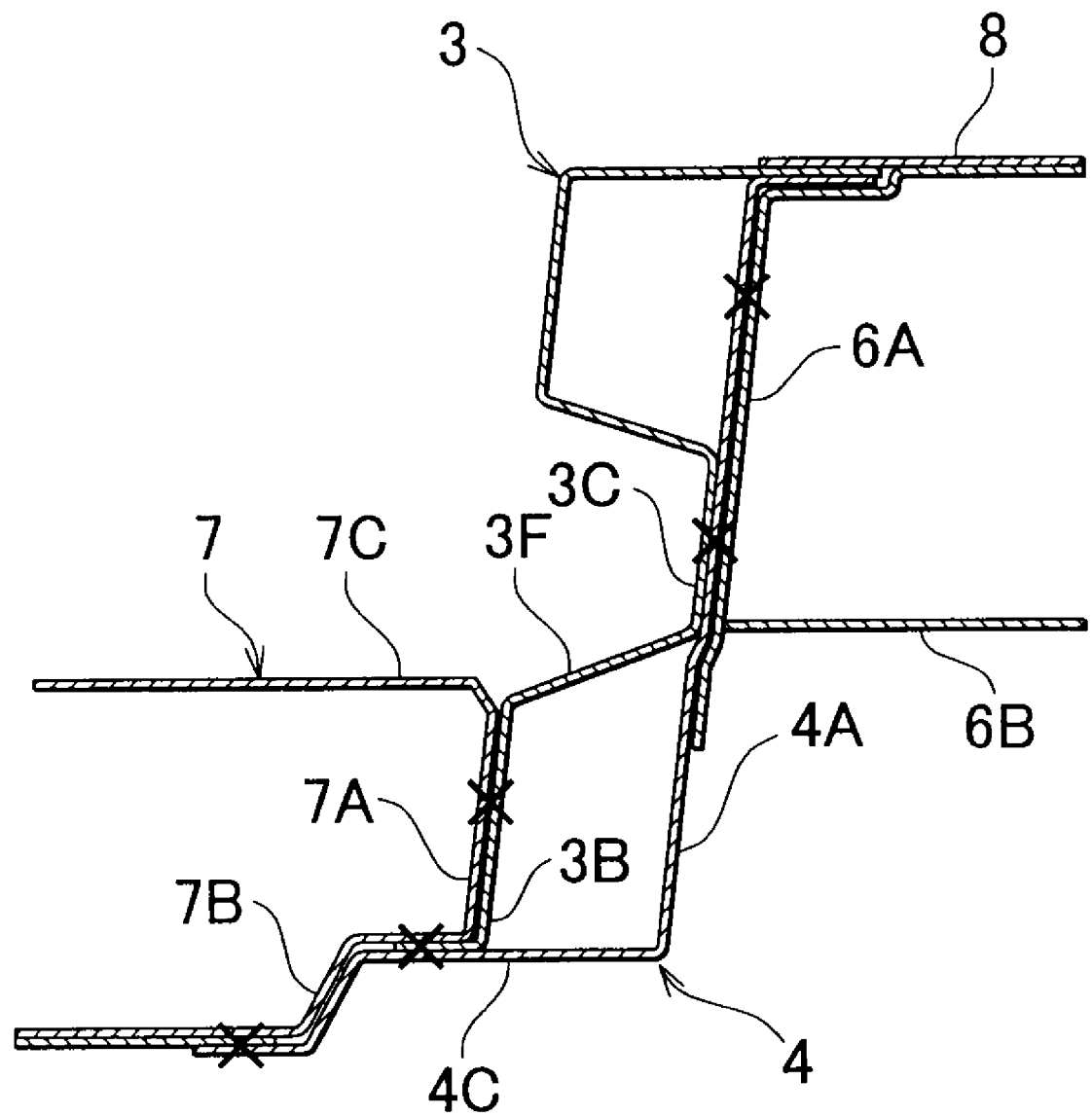
FIG. 3 is a vertical cross-sectional view showing the cross member at a portion at which the cross member is connected to a front floor member shown in FIG. 1.

The right portion and the left portion (left portion is not shown) of the center floor cross member 2, formed by connecting the front cross member 3 and the rear cross member 4 to each other, are connected to the side faces of the rocker inner members 5 shown in FIG. 1. Rear end portions of the front floor members 7 are connected to the front cross member 3 of the center floor cross member 2. That is, as shown in FIG. 3, rear end faces 7A of the front floor members 7 are connected to the lower projection face portion 3B of the front cross member 3, and lower connection end portions 7B of the front floor members 7 are connected to the upper face of the lower connection portion 4C of the rear cross member 4.

Front end faces 6A of the rear floor side members 6 are connected to the vertical wall portion 4A of the rear cross member 4. In this state, upper face portions 7C of the front floor members 7, an upper face portion 3F of the lower projection face portion 3B of the front cross member 3, and lower face portions 6B of the rear floor side members 6 are on substantially the same level.

In the thus structured vehicle lower body structure according to the first embodiment of the invention, the center floor cross member 2, which is provided at the rear portion of the front floor 1 of the vehicle compartment, forms the step portion which has closed section portions, and which extends upward. An upper closed section portion formed by the upper projection face portion 3A and a lower closed section portion formed by the lower projection face portion 3B are formed between the front cross member 3 and the rear cross member 4 that form the center floor cross member 2.

Therefore, the step portion formed at the rear portion of the front floor 1, which is formed of the center floor cross member 2, has higher buckling strength in the lateral direction of the vehicle body and bending strength in the front-rear direction of the vehicle body than those of a step portion that is formed of an existing center floor cross member. As a result, the strength of the front floor 1 and the rear floor 8 that are provided with the step portion (see FIG. 3) is increased.

Figure 4:
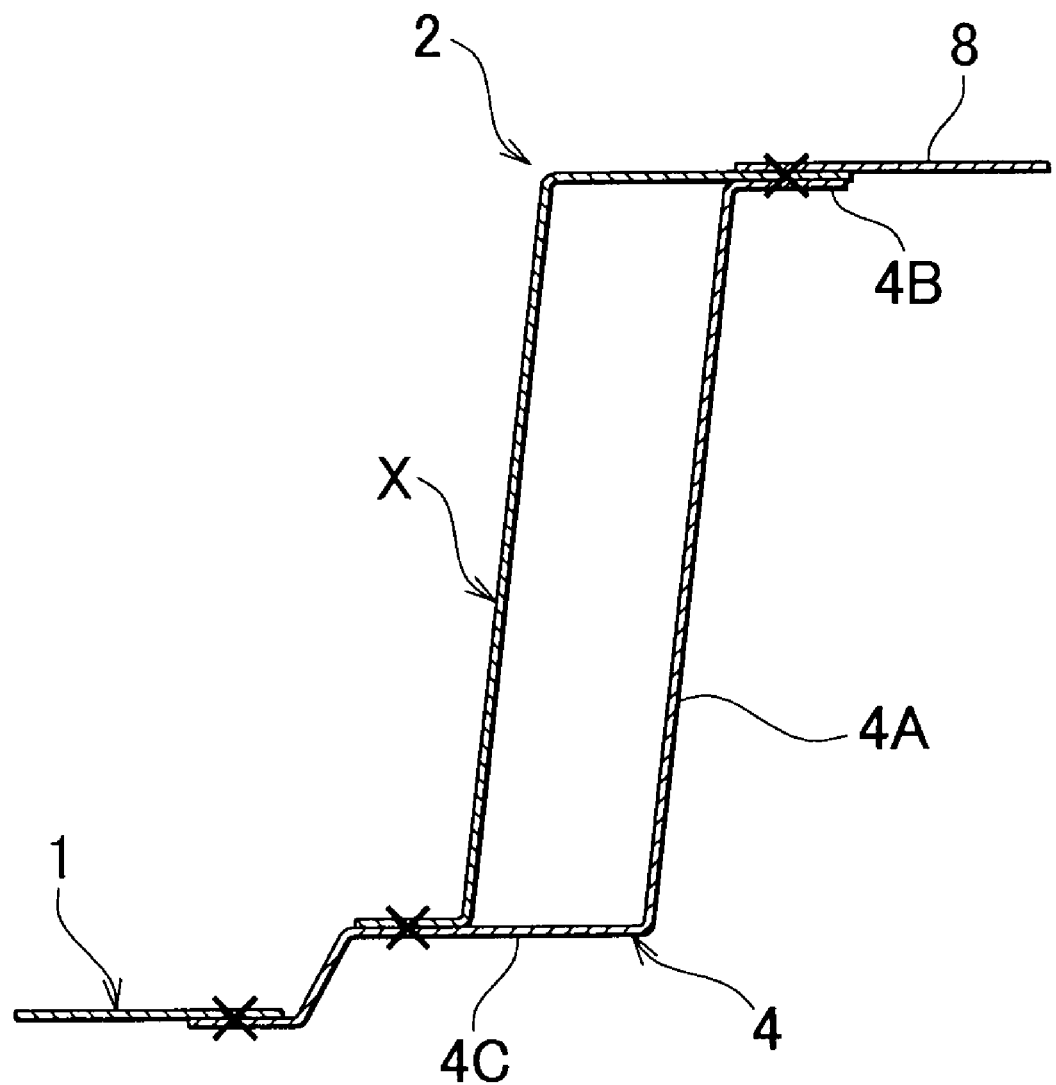
FIG. 4 is a vertical cross-sectional view showing a cross member in an existing vehicle lower body structure, which is compared with the cross member in FIG. 2.

FIG. 4 shows a step portion that is formed of an existing center floor cross member and that is formed at the rear portion of the front floor 1. A front cross member X of the center floor cross member 2 has a substantially L-shaped cross section, and a closed section portion, which is vertically long and short in the front-rear direction of the vehicle body, is formed between the front cross member X and the rear cross member 4.

As described above, with the vehicle lower body structure according to the first embodiment of the invention, the buckling strength of the step portion in the lateral direction of the vehicle body and the bending strength of the step portion in the front-rear direction of the vehicle body are increased because the front cross member 3 of the center floor cross member 2 forms a plurality of closed section portions in cooperation with the rear cross member 4. As a result, it is possible to increase the strength of the front floor 1 and the rear floor 8 of the vehicle compartment, which are provided with the step portion, that is, the strength of the frame that forms the vehicle compartment.

In addition, the closed section portions are connected to each other via a portion at which the front cross member 3 and the rear cross member 4 are continuously overlapped with each other. Therefore, the buckling strength of the step portion in the lateral direction of the vehicle body and the bending strength of the step portion in the front-rear direction of the vehicle body are further increased. As a result, it is possible to further increase the strength of the frame that forms the vehicle compartment.

Further it is possible to increase the strength of the frame that forms the vehicle compartment without an increase in the weight of the vehicle body because the plurality of continuous closed section portions is formed between the front cross member 3 and the rear cross member 4, more specifically, the closed section portions are formed between the front cross member 3 having the corrugated cross section and the rear cross member 4, as described above.

In addition, in the vehicle lower body structure according to the first embodiment of the invention, the rear end faces 7A of the paired right and left front floor members 7 (left front member 7 is not shown) connected to the upper face of the front floor 1 are connected to the lower projection face portion 3B of the front cross member 3, and the lower connection end portions 7B of the lower portions of the front floor members 7 are connected to the upper face of the lower connection portion 4C of the rear cross member 4. In addition, the upper face portions 7C of the front floor members 7, and the upper face portion 3F of the lower projection face portion 3B of the front cross member 3 are on substantially the same level. Therefore, if a load from the front of the vehicle is applied to the front floor 1 of the vehicle compartment, the load is efficiently transmitted from the paired right and left front floor members 7 to the center floor cross member 2.

In the center floor cross member 2, a plurality of continuous closed section portions is formed between the front cross member 3 and the rear cross member 4. Therefore, the bending strength of the center floor cross member 2 in the front-rear direction of the vehicle body is increased. In addition, the upper face portion 3F of the lower projection face portion 3B of the front cross member 3 and the lower face portions 6B of the rear floor side members 6 are on substantially the same level. Therefore, the load that is transmitted from the paired right and left front floor members 7 to the center floor cross member 2 is efficiently and reliably transmitted from the both end portions of the center floor cross member 2 to the rocker inner members 5 and the rear floor side members 6.

That is, when a load from the front of the vehicle is applied to the front floor 1 of the vehicle compartment, it is possible to efficiently transmit the load from the front floor members 7 to the center floor cross member 2, and to efficiently and reliably transmit the load from the both end portions of the center floor cross member 2 to the rocker inner members 5 and the rear floor side members 6.

The structure of the center floor cross member 2 has been described above. The above-described structure may be applied to a front floor cross member that is used to form a step portion that extends upward from a front portion of the front floor 1.

The shape of the corrugated cross section of the front cross member 3 shown in FIG. 2 may be changed as needed. For example, the front cross member 3 may have a cross section having at least two recessed face portions between the upper projection face portion 3A and the lower projection face portion 3B.

In addition, the shape of the corrugation of the front cross member 3 may be trapezoidal, rectangular or the like.

In a second embodiment and a third embodiment of the invention described below as well as in the first embodiment of the invention, the number of corrugation may be at least two, and the shape of the corrugation may be trapezoidal, rectangular or the like.

Figure 5:
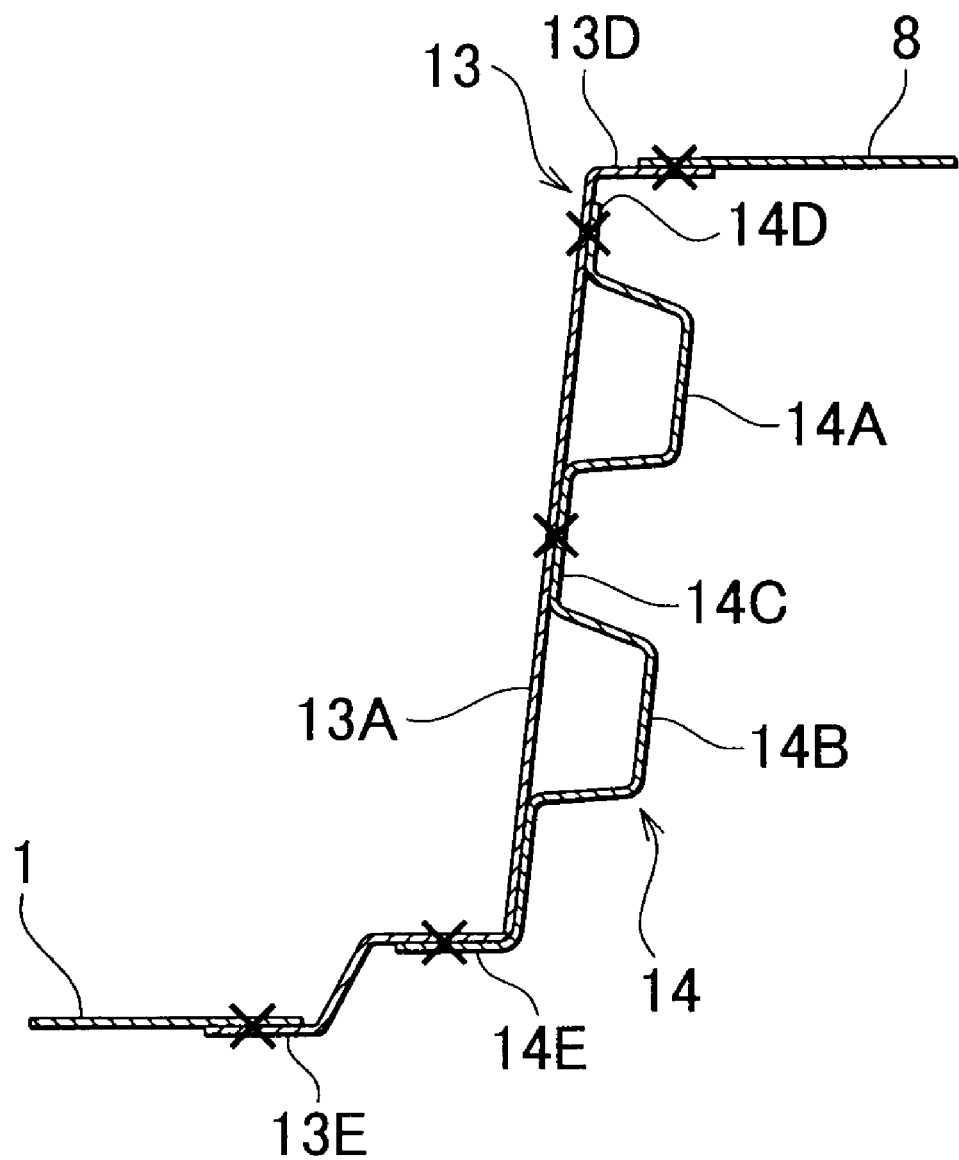
FIG. 5 is a vertical cross-sectional view showing a cross member of a vehicle lower body structure according to a second embodiment of the invention.

FIG. 5 is a vertical cross-sectional view showing a cross member of a vehicle lower body structure according to the second embodiment of the invention.

The second embodiment differs from the first embodiment in that a flat front cross member 13 is used instead of the front cross member 3 that has the corrugated cross section, and a rear cross member 14 that has a corrugated cross section is used instead of the flat rear cross member 4.

The rear cross member 14 is formed in such a manner that projection face portions 14A and 14B that form the corrugations project toward the rear of the vehicle body. The rear cross member 14 forms a plurality of closed section portions in cooperation with the front cross member 13.

More specifically, a vertical wall portion 13A that forms a flat portion of the front cross member 13 is connected to the front face of a recessed face portion 14C that is formed between an upper projection face portion 14A and a lower projection face portion 14B of the rear cross member 14, an upper connection portion 13D, which extends from an upper portion of the vertical wall portion 13A toward the rear of the vehicle body, is connected to the bottom face of the front end portion of the rear floor 8, and a lower connection portion 13E that extends from a lower portion of the vertical wall portion 13A toward the front of the vehicle body is connected to the bottom face of the rear end portion of the front floor 1. The upper connection portion 14D of the rear cross member 14 is connected to the rear face of the vertical wall portion 13A of the front cross member 13, and a lower connection portion 14E, which extends from the lower portion of the rear cross member 14 toward the front of the vehicle body, is connected to the bottom face of the lower portion of the front cross member 13.

Therefore, a step portion that has a plurality of (two, in the second embodiment) closed section portions is formed on the front floor 1 of the vehicle compartment by the front cross member 13 and the rear cross member 14. These closed section portions are connected to each other via a portion at which the front cross member 13 and the rear cross member 14 are continuously overlapped with each other.

According to the second embodiment of the invention described above as well as the first embodiment of the invention, a plurality of closed section portions is formed by the front cross member 13 and the rear cross member 14, and these closed section portions are connected to each other via a portion at which the front cross member 13 and the rear cross member 14 are continuously overlapped with each other. Accordingly, the buckling strength of the step portion in the lateral direction of the vehicle body and the bending strength of the step portion in the front-rear direction of the vehicle body are increased. As a result, it is possible to increase the strength of the frame that forms the vehicle compartment without an increase in the weight of the vehicle body.

In addition, because the front cross member 13 is flat and the rear cross member 14 has the projection face portions 14A and 14B that project toward the rear of the vehicle body, the cross member according to the second embodiment does not have recesses and projections within the vehicle compartment.

Figure 6:
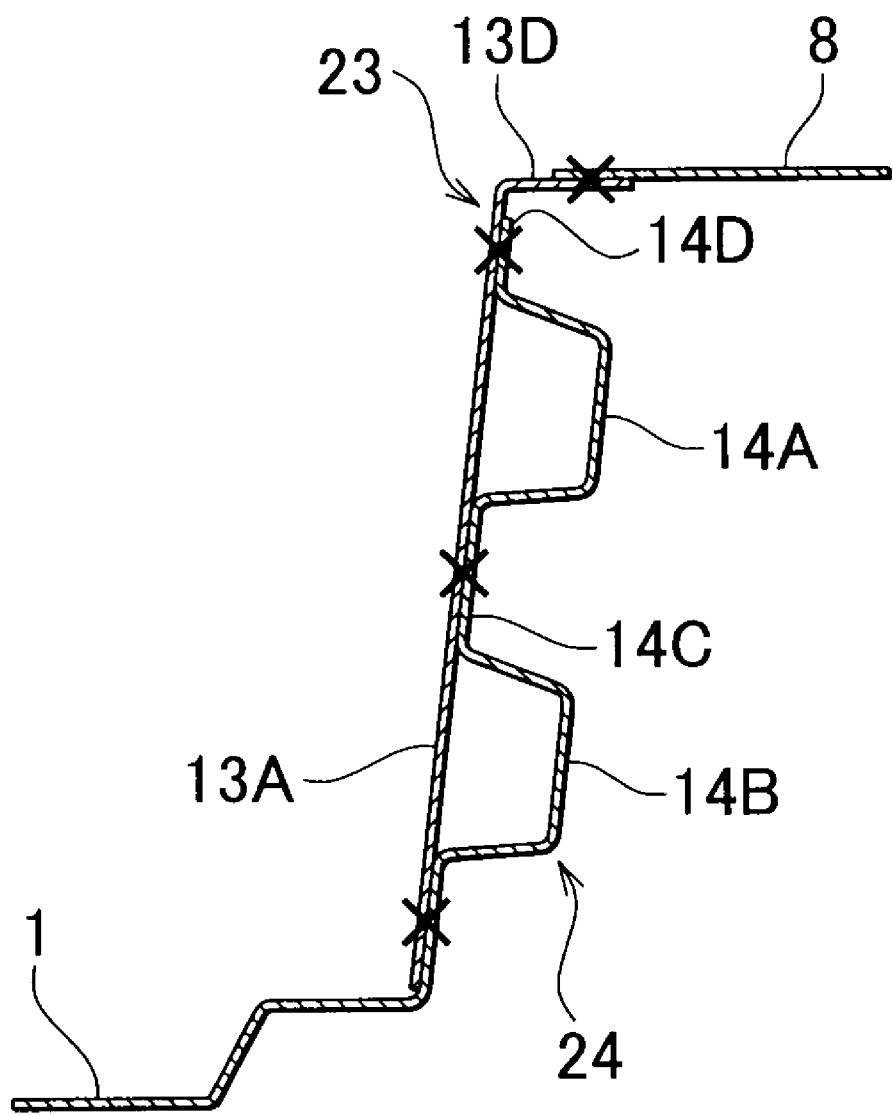
FIG. 6 is a vertical cross-sectional view showing a cross member of a vehicle lower body structure according to a third embodiment of the invention.

FIG. 6 is a vertical cross-sectional view showing a cross member of a vehicle lower body structure according to the third embodiment of the invention.

The third embodiment differs from the second embodiment in that a rear cross member 24 is used instead of the rear cross member 14. The front floor 1 in the second embodiment has an extended portion that extends rearward. The rear cross member 24 is formed by bending the extended portion of the front floor 1 in such a manner that the projection face portions 14A and 14B are formed as in the second embodiment. The third embodiment differs from the second embodiment in that the rear cross member 24 is formed integrally with the front floor 1.

Therefore, instead of the front cross member 13 that is connected at the lower connection portion 13E to the front floor 1, a front cross member 23 is used. A lower portion of the vertical wall portion 13A of the front cross member 23 is connected to a lower portion (portion that is lower than the lower projection face portion 14B) of the rear cross member 24.

According to the third embodiment of the invention, it is possible to produce the same effects as those in the second embodiment of the invention. In addition, according to the third embodiment, the production cost is reduced because the rear cross member 24 is formed by bending the a portion of the front floor 1 and the rear cross member 24 and the front floor 1 are formed of the same member. In addition, the buckling strength of the step portion in the lateral direction of the vehicle body and the bending strength of the step portion in the front-rear direction of the vehicle body are increased easily by changing, for example, the material or the thickness of the front cross member 23. That is, because a desired strength is achieved by appropriately designing the front cross member 23, it is possible to suppress an increase in the weight of the front floor 1.

In the third embodiment of the invention, the rear cross member 24 is formed by bending a portion of the front floor 1 so that the rear cross member 24 is formed integrally with the front floor 1. Alternatively, the front cross member 23 may be formed by bending a portion of the front floor 1 so that the front cross member 23 is formed integrally with the front floor 1. The structure in which the front cross member or the rear cross member is formed by bending a portion of the front floor 1 may be applied to the first embodiment of the invention.

In the above-described embodiments, preferably, the front cross members 3, 13 and 23 have higher strength against a load applied from the front of the vehicle than the rear cross members 4, 14 and 24 for the following reason. When a load is applied from the front of the vehicle to the center portion of the cross member, a compression force is applied to the front cross members 3, 13 and 23 that are closer to the front of the vehicle, and a tensile force is applied to the rear cross members 4, 14 and 24 that are closer to the rear of the vehicle. Generally, the condition for deformation, which should be satisfied by a member that receives a compression force is severer than the condition for deformation, which should be satisfied by a member that receives a tensile force.

What is claimed is:

1. A vehicle lower body structure, comprising:
   a cross member that extends in a vehicle-width direction, that defines part of a vehicle compartment, and that includes a first cross member which is formed of a plate member and a second cross member which is formed of a plate member, the second cross member being provided at a position closer to a rear of a vehicle than the first cross member, the first cross member and the second cross member facing each other, wherein
   a plurality of closed section portions are formed by the first cross member and the second cross member,
   the closed section portions are connected to each other via a recessed face portion at which the first cross member and the second cross member are continuously overlapped with each other, and
   wherein at least a portion of the interior of a first closed section portion is provided directly above at least a portion of the interior of a second closed section portion.

2. The vehicle lower body structure according to claim 1, wherein:
   the second cross member has at least two projection portions that project toward the rear of the vehicle, and that are used to form the closed section portions.

3. The vehicle lower body structure according to claim 1, wherein:
   the first cross member has at least two projection portions that project toward a front of the vehicle, and that are used to form the closed section portions,
   wherein the recessed face portion is located between the at least two projection portions.,
   an end portion of a floor reinforcement member, which is provided on a floor of the vehicle compartment and which extends in a front-rear direction of a vehicle body, is connected to an end face of the lowest projection portion of the first cross member, which defines part of the vehicle compartment.

4. The vehicle lower body structure according to claim 3, wherein an upper face of the floor reinforcement member and an upper face of the lowest projection portion of the first cross member are on substantially the same level.

5. The vehicle lower body structure according to claim 1, wherein the first cross member has a higher strength against a load applied from a front of the vehicle than the second cross member.

6. The vehicle lower body structure according to claim 1, wherein one of the first cross member and the second cross member is formed by bending part of a floor panel.

7. The vehicle lower body structure according to claim 1, wherein:
   one of the first cross member and the second cross member has a flat cross section at a portion at which the one of the first cross member and the second cross member faces the other of the first cross member and the second cross member; and
   the other of the first cross member and the second cross member has a corrugated cross section at a portion at which the other of the first cross member and the second cross member faces the one of the first cross member and the second cross member.

8. The vehicle lower body structure according to claim 1, wherein substantially all of the interior of the first closed section portion is provided directly above substantially all of the interior of the second closed section portion.

9. The vehicle lower body structure according to claim 6, wherein one of the first cross member and the second cross member extends substantially vertically from the floor panel.

10. The vehicle lower body structure according to claim 1, wherein the portion at which the first cross member and the second cross member are continuously overlapped with each other is arranged in a substantially vertical direction.

11. The vehicle lower body structure according to claim 1, further comprising:
   a rear floor of the vehicle; and
   a front floor of the vehicle,
   wherein the second cross member includes an upper connection portion that extends from an upper portion of the second cross member toward the rear of the vehicle body, and a lower connection portion that extends from a lower portion of the second cross member towards a front of the vehicle body,
   wherein the upper connection portion of the second cross member is connected to a front end portion of the rear floor, and
   wherein the lower connection portion of the second cross member is connected to a rear end portion of the front floor.

12. The vehicle lower body structure according to claim 11,
   wherein the first cross member includes an upper connection portion and a lower connection portion,
   wherein the upper connection portion of the first cross member is connected to the upper connection portion of the second cross member and the front end portion of the rear floor,
   wherein the lower connection portion of the first cross member is connected to the lower connection portion of the second cross member at a different location than where the lower connection portion is connected to the rear end portion of the front floor of the vehicle.

13. The vehicle lower body structure according to claim 3, wherein a lower connection portion of the floor reinforcement member is connected to a lower connection portion of the second cross member.

14. The vehicle lower body structure according to claim 3, further comprising:
   a rear floor of the vehicle having at least a front end face portion and a lower face portion,
   wherein an upper face of the floor reinforcement member, an upper face of the lowest projection portion of the first cross member, and the lower face portion of the rear floor are provided substantially on a same level.

* * * * *